United States Patent [19]
Fukushima

[11] Patent Number: 5,685,404
[45] Date of Patent: Nov. 11, 1997

[54] POWER TRANSMISSION SYSTEM FOR USE WITH A MANUAL TRANSMISSION INCLUDING A TORQUE CONVERTOR

[75] Inventor: Hirotaka Fukushima, Hirakata, Japan

[73] Assignee: Exedy Corporation, Osaka, Japan

[21] Appl. No.: 523,859

[22] Filed: Sep. 6, 1995

[30] Foreign Application Priority Data

Sep. 29, 1994 [JP] Japan .................................. 6-234960

[51] Int. Cl.⁶ .................................................. F16D 33/18
[52] U.S. Cl. ........................ 192/3.26; 74/730.1; 192/3.28
[58] Field of Search ................................. 192/3.25, 3.26, 192/3.28; 74/730.1

[56] References Cited

U.S. PATENT DOCUMENTS

| | | | |
|---|---|---|---|
| 4,844,216 | 7/1989 | Fukushima | 192/3.26 |
| 4,972,736 | 11/1990 | Koshimo | 74/730.1 |
| 5,020,646 | 6/1991 | Koshimo | 192/3.25 |
| 5,400,884 | 3/1995 | Matsuoka | 192/3.25 |

FOREIGN PATENT DOCUMENTS

| | | |
|---|---|---|
| 2398231 | 2/1979 | France . |
| 1550925 | 8/1969 | Germany . |
| 64-38355 | 3/1989 | Japan . |

*Primary Examiner*—Charles A. Marmor
*Assistant Examiner*—Sherry Lynn Estremsky
*Attorney, Agent, or Firm*—Shinjyu Office of Patent Attorney

[57] ABSTRACT

A power transmission system 1 includes a lock-up clutch 5, an elastic coupling mechanism 7, a torque converter 4 and a torque disengaging clutch 6. The lock-up clutch 5 is coupled to a power output shaft 2 so as to receive torque from the power input shaft 2. The elastic coupling mechanism 7 is coupled to the lock-up clutch 5 so as to receive torque from the lock-up clutch 5 and is capable of being deformed in circular directions. The torque converter 4 is coupled to the power output shaft 2 so as to receive torque from the power output shaft 2. The torque disengaging clutch 6 is coupled to the elastic coupling mechanism 7 and the torque converter 4 so as to receive torque from them respectively and is further coupled to a power input shaft 3 of a transmission.

13 Claims, 6 Drawing Sheets

POWER TRANSMISSION SYSTEM FOR USE WITH A MANUAL TRANSMISSION INCLUDING A TORQUE CONVERTOR

BACKGROUND OF THE INVENTION

A. Field of the Invention

The present invention relates to a power transmission system for transmitting torque from an engine to a manual transmission, and more particularly, it relates to a power transmission system which includes a clutch mechanism, a torque converter and a lock-up clutch associated with the torque converter.

B. Description of the Related Art

There are two general categories of transmissions used in automotive vehicles, specifically, automatic transmissions and manual transmissions. Typically, an operator controlled clutch mechanism is used to selectively transmit power from an internal combustion engine to the manual transmission. Typically, an automatic transmission includes a torque converter in order to transmit torque from the engine to the transmission. In recent years, clutch mechanisms for manual transmissions have become more sophisticated and some configurations include a torque converter coupled to the clutch mechanism.

Some conventional torque converters (for automatic transmissions) are provide with a lock-up clutch such that, under predetermined circumstances, torque may be transmitted directly from the engine to the automatic transmission via the lock-up clutch without the energy losses or inefficiencies that are inherent in a torque converter.

Japanese utility Model No. JP64-38355 discloses the use of a torque converter for transmitting power between an engine and a manual transmission. The device includes the torque converter, a clutch mechanism and a lock-up clutch mechanism. The clutch mechanism couples a turbine of the torque converter with a power input shaft of the manual transmission. The clutch mechanism is disposed proximate to the portion of the turbine that is closest to the engine. Between the clutch mechanism and the power input shaft of the transmission, an elastic coupling element having coil springs is provided. The elastic coupling element absorbs shock caused by engagement of the clutch mechanism to reduce the amount of shock transmitted to the transmission.

When a vehicle is started, torque is transmitted from the engine to the torque converter, and an increase in the torque by the torque converter enables the vehicle to start smoothly. When the number of revolutions of the power input shaft of the transmission reaches a certain level, the lock-up clutch is actuated, and torque is directly transmitted from the power input element to the power input shaft of the transmission. Since the torque is mechanically transmitted in this situation, the vehicle runs experiences improved fuel consumption. For shifting gears, the clutch mechanism is engaged and disengaged by an operator or vehicle driver.

In order to reduce the occurrence of abnormal sounds from the drive train of a vehicle, such as clattering sounds or indistinct sounds of the transmission while driving a vehicle, it is desirable to reduce a resonance frequency of the drive train (i.e. the clutch and transmission) to the idle speed of the engine or below.

In a vehicle having the above-described conventional power transmission system, when the lock-up device is engaged, the power transmission system is basically divided into a power input section and a power output section generally divided by coil springs of a disengaging clutch. In order to attain a resonance frequency equal to or below the idle RPM of the engine in such a power transmission system, it is necessary to attain a sufficiently large ratio of moment of inertia of the power output section to the power input section. In the above described system, however, since main bodies of the lock-up clutch and the disengaging clutch are provided in the power input section, the ratio of the moment of inertia of the power output section to the power input section is not sufficiently large.

Further, since the disengaging clutch is provided in a torque converter close to the engine in the conventional power transmission system, the dimensions of the power transmission system in axil directions is somewhat large.

SUMMARY OF THE INVENTION

Accordingly, it is an object of the present invention to attain a larger ratio of moment of inertia of a power output section to a power input section.

It is another object of the present invention to attain a generally small dimension of a power transmission system in axial directions.

In one aspect of the present invention, a power transmission system includes a power input section which includes a flywheel. An elastic coupling mechanism is connected to the power input section. A power output section is connected to a manual transmission input shaft and to the elastic coupling mechanism. Further, the power output section includes a selectively operable disengaging clutch and at least a turbine of a torque converter. The turbine is coupled to the disengaging clutch. The ratio of the moment of inertia of the power input section to the moment of inertia of the power output section provides a resonance frequency of the power transmission system less than or equal to an idle speed of an engine connected to the flywheel.

In a first embodiment of the present invention, the power transmission system further includes a lock-up clutch disposed within the power input section, the lock-up clutch being connected to the elastic coupling mechanism and connected to the flywheel. In the first embodiment, an impeller of the torque converter is part of the power input section.

In a second embodiment, the power transmission system further includes a lock-up clutch disposed within the power output section connected to the elastic coupling mechanism and the turbine. Further in the second embodiment, an impeller of the torque converter is part of the power input section.

In a third embodiment, the power transmission system includes a lock-up clutch disposed within the power output section connected to the elastic coupling mechanism and the turbine. In the third embodiment, an impeller of the torque converter is part of the power output section.

In an aspect of the invention in accordance with the first embodiment, a power transmission system is configured with a lock-up clutch having a lock-up input and a lock-up output, the lock-up input being coupled to a flywheel. An elastic coupling mechanism is coupled to the lock-up output. The power transmission system also includes a torque converter having an impeller and a turbine, the impeller coupled to the flywheel and the lock-up input. Further, the power transmission system includes a disengaging clutch having an input side and an output side, the input side being coupled to the elastic coupling mechanism and the turbine and the output side coupled to a manual transmission input shaft.

In another aspect of the first embodiment, the elastic coupling mechanism, the lock-up clutch and the disengaging clutch are disposed proximate to an outer axial portion of the turbine of the torque converter.

In another aspect of the invention in accordance with the second embodiment, the power transmission system includes an elastic coupling mechanism coupled to a flywheel and a torque converter having a turbine and an impeller, the impeller coupled to the flywheel. A lock-up input of a lock-up clutch having a lock-up input and a lock-up output, is coupled to the elastic coupling mechanism and the turbine. A disengaging clutch having an input side and an output side, has its input side coupled to the turbine and the lock-up output and the output side coupled to a manual transmission input shaft.

Further, in the second embodiment, the elastic coupling mechanism, the lock-up clutch and the disengaging clutch are disposed proximate to an outer axial portion of the turbine of the torque converter.

In the third embodiment, the power transmission system includes an elastic coupling mechanism coupled to a flywheel and a torque converter having an impeller and a turbine, the impeller being coupled to the elastic coupling mechanism. A lock-up clutch having a lock-up input and a lock-up output, has its lock-up input coupled to the elastic coupling mechanism and the turbine. A disengaging clutch having an input side and an output side, has its input side coupled to the turbine and the lock-up output and the output side coupled to a manual transmission input shaft.

In the third embodiment, the elastic coupling mechanism, the lock-up clutch and the disengaging clutch are disposed proximate to an outer axial portion of the turbine of the torque converter.

In the power transmission system in accordance with the first embodiment of the present invention, torque, when applied from the flywheel to the torque converter, is transmitted from the torque converter to transmission input shaft. With engagement of the lock-up clutch though, the torque is transmitted to the disengaging clutch through the elastic coupling mechanism. When the disengaging clutch is released, torque transmission to the transmission input shaft is interrupted.

A power input section and a power output section are defined within the power transmission system. The elastic coupling mechanism defines a boundary between the power input section and the power output section. In prior art configurations, the disengaging clutch is disposed in the power input section.

In the present invention, the disengaging clutch is disposed in the power output section of the power transmission system. Herein a larger ratio of moment of inertia of the power output section to the power input section is attained when compared to the prior art.

In the power transmission system in the second embodiment of the present invention, torque is applied from the flywheel to the elastic coupling mechanism and then transmitted to the torque converter, and the torque is further transmitted to the transmission input shaft through the disengaging clutch. When the lock-up clutch is engaged, the torque is directly transmitted to the disengaging clutch. In the second embodiment, the disengaging clutch and the lock-up clutch (which are components of the power input section in the prior art) are disposed in a power output section in the power transmission system. In this configuration, a larger ratio of moment of inertia of the power output section to the power input section is attained compared to the prior art.

In the power transmission system in the third embodiment of the present invention, when torque is applied from the flywheel to the elastic coupling mechanism, the torque is transmitted to the torque converter and further transmitted to the transmission input shaft through the disengaging clutch intervening between them. When the lock-up clutch is engaged, the torque from the elastic coupling mechanism is directly transmitted to the disengaging clutch. When the disengaging clutch is released, torque transmission to the transmission input shaft is discontinued. In the third embodiment, the torque converter, the lock-up clutch and the disengaging clutch are disposed in a power output section in the power transmission system. In this way, a larger ratio of moment of inertia is attained in the power output section.

In the event that the elastic coupling mechanism, the lock-up clutch and the disengaging clutch are disposed close to an outer circumference of the torque converter, the power transmission system becomes smaller in dimension in axial directions.

These and other objects, features, aspects and advantages of the present invention will become more fully apparent from the following detailed description of the present invention when taken in conjunction with the accompanying drawings where like reference numerals denote corresponding parts throughout, in which:

DETAILED DESCRIPTION OF THE PREFERRED EMBODIMENT

FIRST EMBODIMENT

Figure 1:
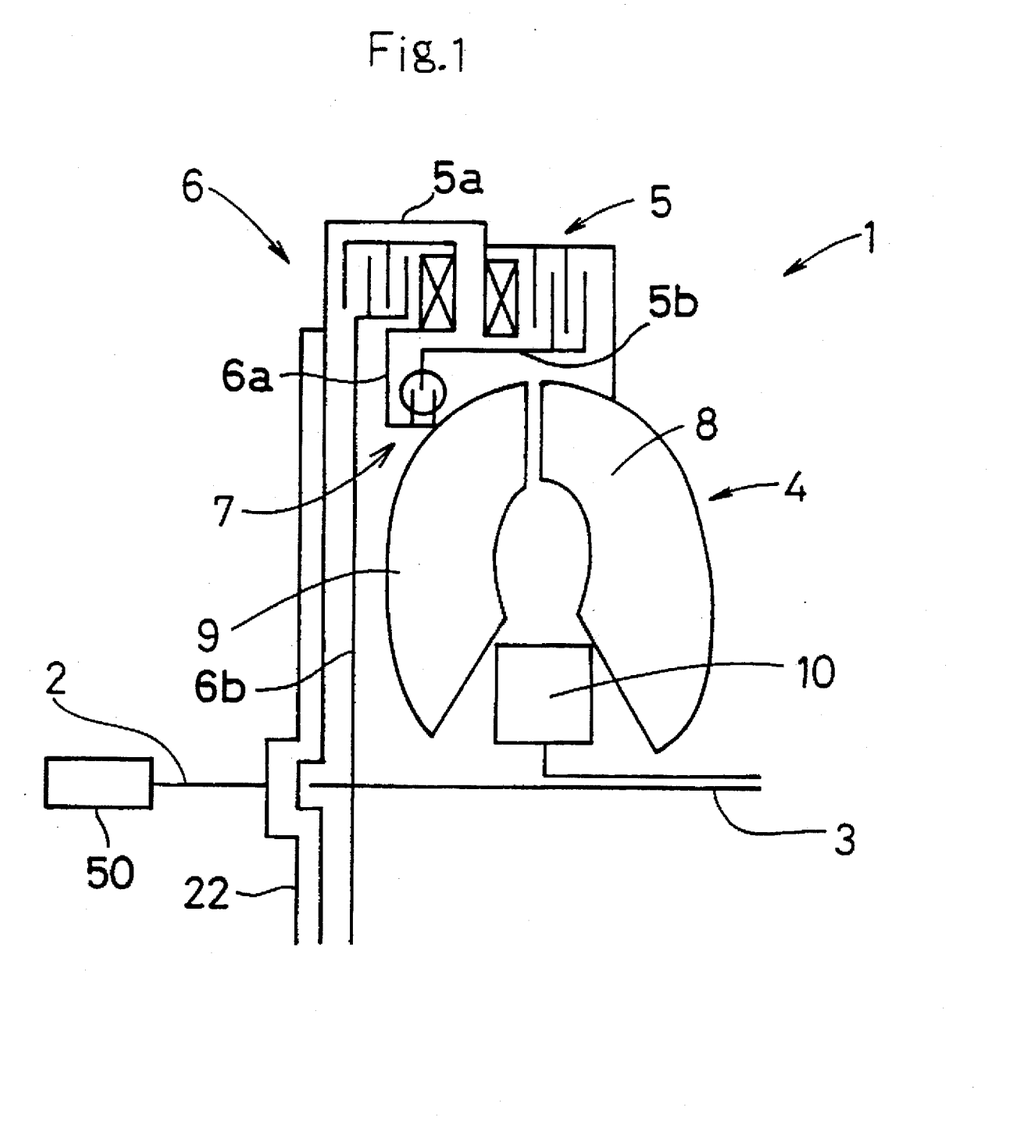
FIG. 1 is a schematic side view showing a representation of a torque converter in accordance with a first preferred embodiment of the present invention.
Figure 2:
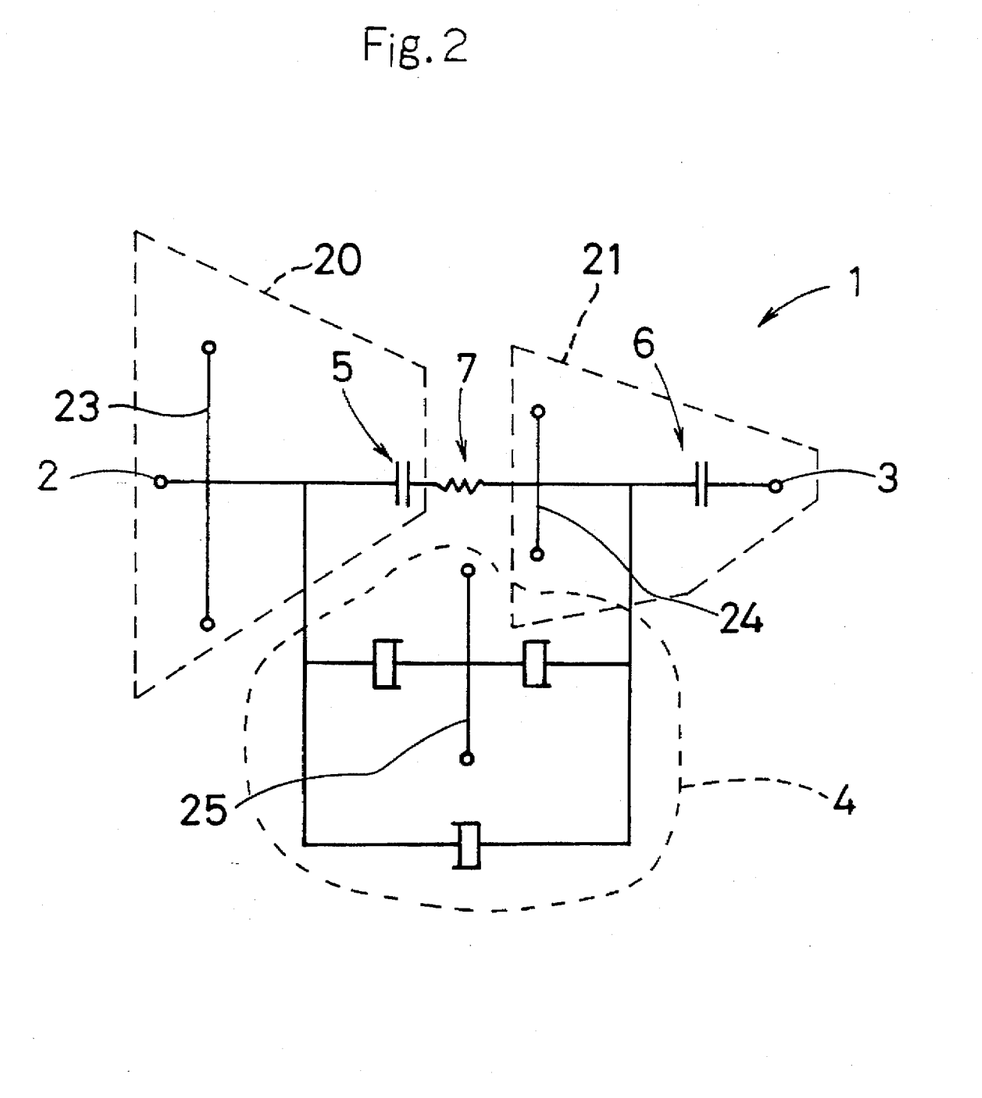
FIG. 2 is a functional diagram showing a dynamic model representing the torque converter depicted in FIG. 1.

FIG. 1 is a schematic cross sectional view showing a power transmission system 1 in a first preferred embodiment of the present invention while FIG. 2 is a functional diagram showing a dynamic model of the power transmission system 1. The power transmission system 1 is configured to transmit torque from a power output shaft 2 of an engine 50 to a power input shaft 3 of a manual transmission (not shown).

The power transmission system 1 is includes a torque converter 4, a lock-up clutch 5, a disengaging clutch 6 and an elastic coupling mechanism 7. The disengaging clutch 6 is selectively engageable and dis-engagable by an operator of the vehicle using the power transmission system 1. The power transmission system 1 is mounted on a flywheel 22.

The torque converter 4 has three primary components: an impeller 8, a turbine 9 and a stator 10. The compeller 8 is coupled to the power output shaft 2 so as to receive torque from the power output shaft 2. For example, the torque converter may have a housing or cover (not shown), the impeller 8 may be fixed to the housing, and the housing may be connected to the power output shaft 2 of the engine 50.

The lock-up clutch 5, the disengaging clutch 6 and the elastic coupling mechanism 7 are disposed close to an outer circumference of the torque converter 4. Consequently, in an axial direction, the dimension of the power transmission system 1 may be smaller, compared to the prior art configurations.

The lock-up clutch 5 is positioned close to the outer circumference of the torque converter 4. A power input member 5a of the lock-up clutch 5 is coupled to the power output shaft 2 in the engine. A power output member 5b of the lock-up clutch 5 is coupled to the elastic coupling mechanism 7.

The elastic coupling mechanism 7 includes a plurality of coil springs and is placed in an outer circumference of the turbine 9 close to the engine 50. The coil springs of the elastic coupling mechanism 7 are disposed functionally between the lock-up clutch 5 and the disengaging clutch 6. The elastic coupling mechanism 7 is compressible in circular directions in response to limited relative rotary displacement between the lock-up clutch 5 and the disengaging clutch 6 when the lock-up clutch 5 is engaged.

The disengaging clutch 6 is disposed, along with the lock-up clutch 5, proximate the engine. The disengaging clutch 6 has a power input member 6a coupled to the elastic coupling mechanism 7 and the turbine 9 and a power output member 6b coupled to the power input shaft 3 of the transmission.

An operation of the power transmission system will be described below.

When the power output shaft 2 in the engine starts rotating, torque is transmitted to the impeller 8 in the torque converter 4. This allows fluid to flow from the impeller 8 toward the turbine 9 to rotate the turbine 9. The torque of the turbine 9 is transmitted to the power input shaft 3 of the transmission through the disengaging clutch 6 therebetween. In this situation, the stator 10 causes the fluid fed back from the turbine 9 to the impeller 8 to be diverted so as to increase the rotation of the impeller. This leads to an increase in torque transmission efficiency.

As the number of revolutions of the power input shaft 3 of the transmission reaches a specified level, the lock-up clutch 5 is engaged. The torque from the power output shaft 2 is transmitted directly to the elastic coupling mechanism 7 and the disengaging clutch 6 through the lock-up clutch 5 thus bypassing the torque converter 4. In the first embodiment, since the torque converter 4 does not intervene, an efficiency of torque transmission is improved, and the vehicle (not shown) is able to operate with greater fuel efficiency.

When a driver presses a clutch pedal (not shown) of the vehicle (not shown) equipped with the power transmission system 1, the disengaging clutch 6 is released, thus discontinuing torque transmission to the transmission. Under such a condition, the driver can operate the manual transmission (not shown) to shift gears.

In the first embodiment, the power transmission system 1 is divided into a power input section 20 and an output section 21, being divided by the elastic coupling mechanism 7 as shown in FIG. 2. However, during normal operation, the vehicle runs in such a state where the lock-up clutch 5 is usually engaged.

With specific reference to FIG. 2, the moment of inertia is shown for various elements in the system 1. For instance, with the lock-up clutch 5 engaged, the moment of inertia 23 is basically a combination of the inertia of a flywheel 22 and the impeller 8. The moment of inertia 24 represents the inertia of the turbine 9, the disengaging clutch 6 and the shaft 3. The moment of inertia 25 represents the inertia of the stator 10.

As described above, the disengaging clutch of the prior art is a component of the power input section 20. In the first embodiment however, the disengaging clutch 6 is provided in the power output section 21 providing a larger ratio of moment of inertia of the power output section 21 to the power input section 20, compared with the prior art. Thus, as the ratio of moment of inertia of the power output section 21 becomes larger, a resonance frequency thereof becomes equal to or lower than an idle speed of the engine 50, and therefore, clattering sounds and indistinct sounds from the manual transmission are diminished while the vehicle is in operation.

SECOND EMBODIMENT

Figure 3:
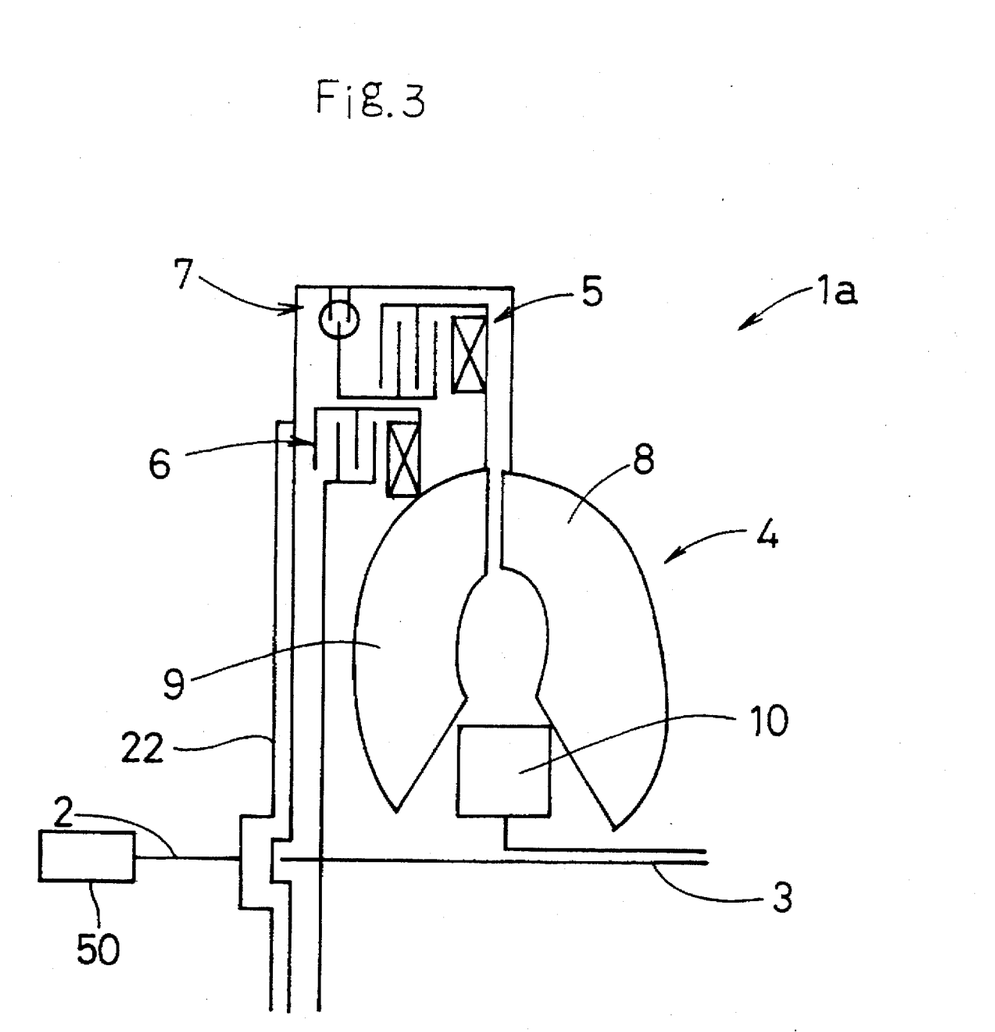
FIG. 3 is a schematic side view showing a representation of a torque converter in accordance with a second preferred embodiment of the present invention.
Figure 4:
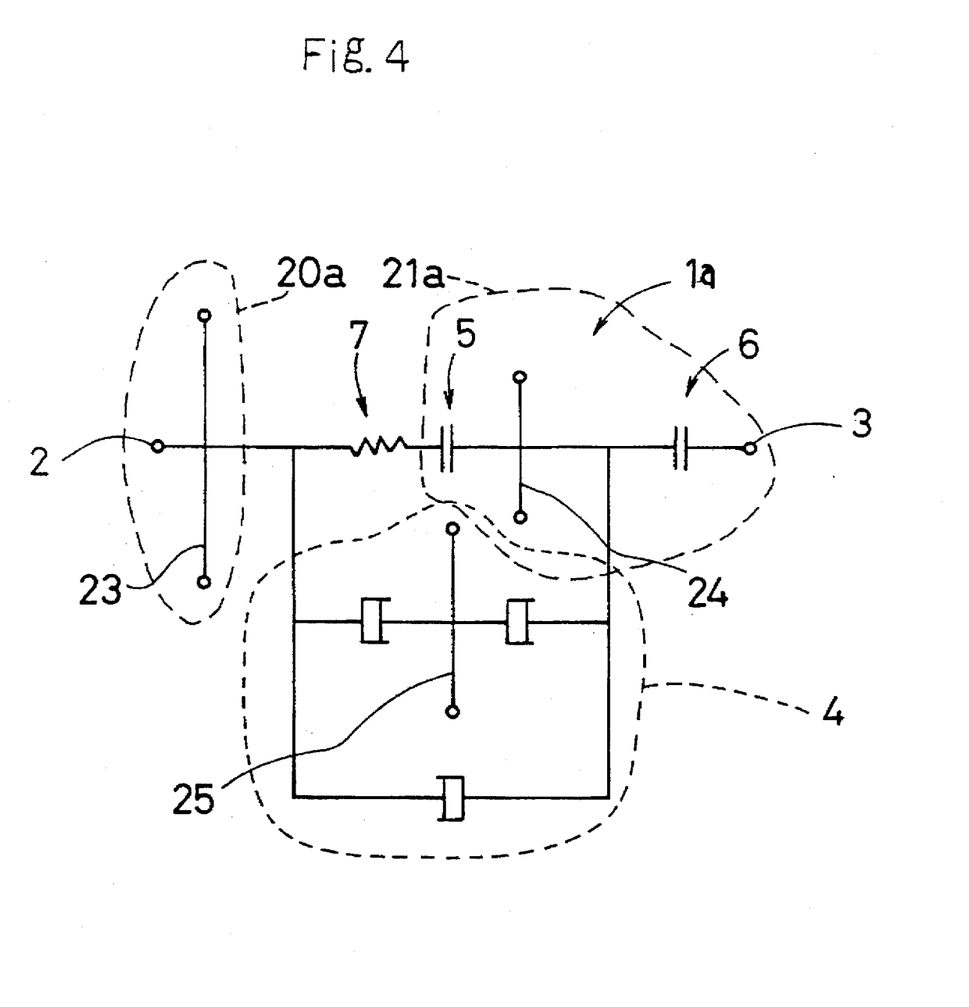
FIG. 4 is a functional diagram showing a dynamic model representing the torque converter depicted in FIG. 3.

In a second preferred embodiment shown in FIG. 3 and FIG. 4, a lock-up clutch 5, a disengaging clutch 6 and an elastic coupling mechanism 7 are disposed close to an outer circumference of a torque converter 4. The configuration of the second embodiment allows to a dimension of a power transmission system 1a be relatively small in axial directions. Specifically, the disengaging clutch 6 is placed in an outer circumference of a turbine close to an engine. The lock-up clutch 5 and the elastic coupling mechanism 7 are disposed close to an outer circumference of the disengaging clutch 6.

The elastic coupling mechanism 7 transmits torque between a power output shaft 2 and the lock-up clutch 5. An impeller 8 of the torque converter 4 is coupled to the power output shaft 2 without the elastic coupling mechanism 7 intervening between them. The disengaging clutch 6 is connected to the turbine 9 and hence to the output of the lock-up clutch 5. The disengaging clutch 6 is further connected to the power input shaft 3 of the transmission (not shown).

By virtue of the above-described configuration, torque from the power output shaft 2 is transmitted to the lock-up clutch 5 through the elastic coupling mechanism 7 disposed therebetween. Torque then is transmitted from the lock-up clutch 5 to the disengaging clutch 6 and then to the power input shaft 3 of the transmission while the vehicle runs in a state where the lock-up clutch 5 is engaged.

In the second embodiment, while the vehicle runs in the state where the lock-up clutch 5 is engaged, the power transmission system 1a is divided into a power input section 20a and a power output section 21a with the elastic coupling mechanism 7 defining a boundary between the two sections.

With specific reference to FIG. 4, the moment of inertia is shown for various elements in the system 1a. For instance, the moment of inertia 23 is basically a combination of the inertia of a flywheel 22 and the impeller 8. The moment of inertia 24 represents the inertia of the turbine 9, the disengaging clutch 6 and the shaft 3. The moment of inertia 25 represents the inertia of the stator 10.

In the configuration of the second embodiment, the disengaging clutch 6 and the lock-up clutch 5 (which are components of the power input section in the prior art) are provided in the power output section 21a. Consequently, a larger ratio of moment of inertia of the power output section 21a to the power input section 20a is attained, as compared with the prior art. Thus, as the ratio of the moment of inertia of the power output section 21a becomes larger, the resonance frequency becomes equal to or lower than the idle speed, or RPM of the engine, and this diminishes clattering sounds and indistinct sounds from the transmission while the vehicle operates. The second embodiment is believed to attain a generally improved effect more significant than in the first embodiment.

THIRD EMBODIMENT

Figure 5:
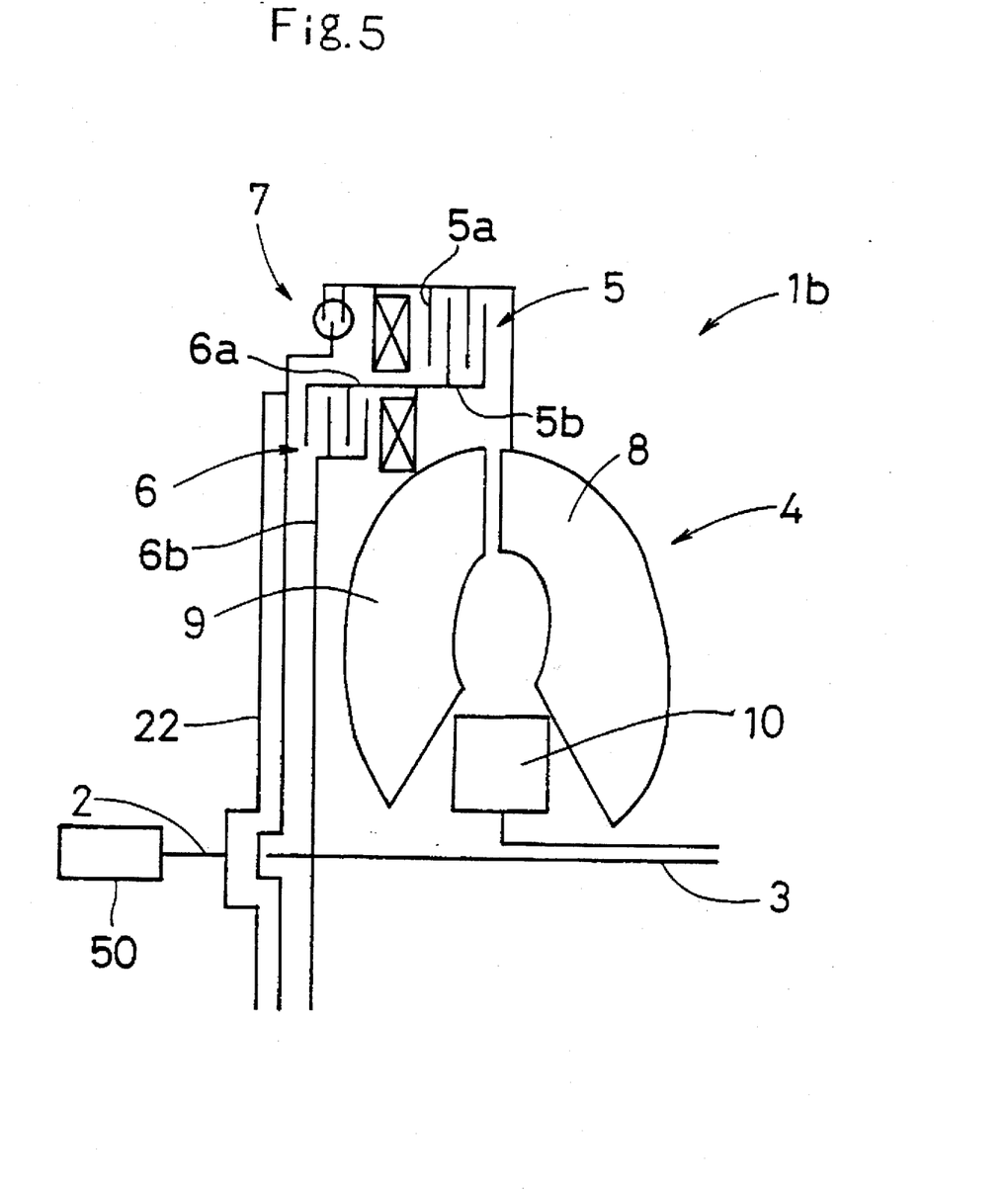
FIG. 5 is a schematic side view showing a representation of a torque converter in accordance with a third preferred embodiment of the present invention.
Figure 6:
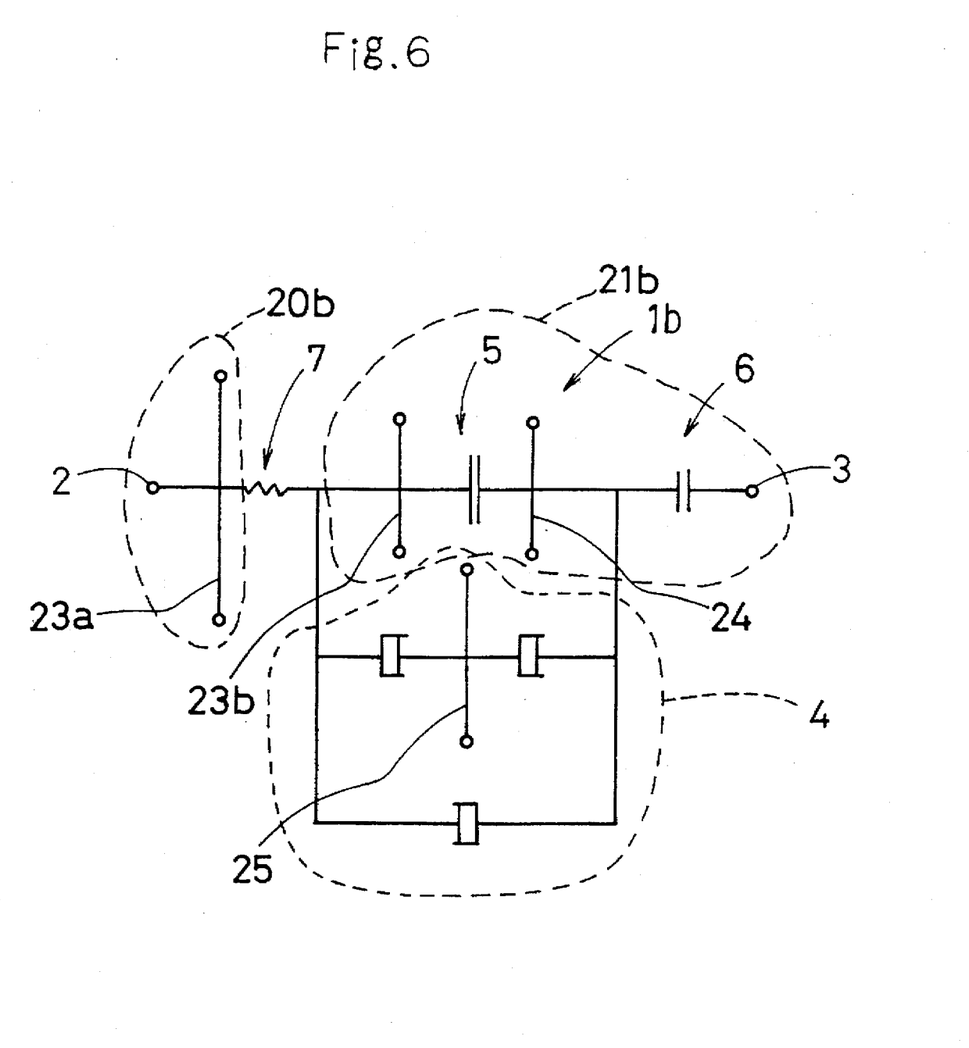
FIG. 6 is a functional diagram showing a dynamic model representing the torque converter depicted in FIG. 5.

In a third embodiment shown in FIG. 5 and FIG. 6, since a lock-up clutch 5, a disengaging clutch 6 and an elastic coupling mechanism 7 are disposed close to an outer circumference of a torque converter 4, a dimension of a power transmission system 1b is small in axial directions. Specifically, the disengaging clutch 6 is placed in an outer circumference of a turbine 9 close to an engine 50. The lock-up clutch 5 and the elastic coupling mechanism 7 are disposed close to an outer circumference of the disengaging clutch 6. The elastic coupling mechanism 7 is coupled directly to the power output shaft 7. The elastic coupling mechanism 7 is further connected to the impeller 8. The input side 5a of the lock-up clutch 5 is connected to the elastic coupling mechanism 7 and the impeller 8. The output side 5b of the lock-up clutch 5 is connected to the turbine 9 and the input side 6a of the disengaging clutch 6. The output side 6b of the disengaging clutch 6 is connected to the transmission input shaft 3.

The elastic coupling mechanism 7 transmits torque between a power output shaft 2 and the lock-up clutch 5. The lock-up clutch 5 transmits the torque to the disengaging clutch 6 and then to the shaft 3.

By virtue of the above-mentioned configuration, when the vehicle operates with the lock-up clutch 5 engaged, torque from the power output shaft 2 is transmitted to the lock-up clutch 5 through the elastic coupling mechanism 7. Torque is then transmitted to the shaft 3 through the disengaging clutch 6.

In this embodiment, when the vehicle operates with the lock-up clutch 5 is engaged, the power transmission system 1b is divided into a power input section 20b and a power output section 21b with a boundary therebetween defined by the elastic coupling mechanism 7.

With specific reference to FIG. 6, the moment of inertia is shown for various elements in the system 1b. For instance, the moment of inertia 23a is the inertia of a flywheel 22. The moment of inertia 23b is basically the inertia of the impeller 8. The moment of inertia 24 basically represents the inertia of the turbine 9, the clutch 6 and the shaft 3. The moment of inertia 25 represents the inertia of the stator 10.

Herein, the lock-up clutch 5 and the disengaging clutch 6 (which are components of the power input section in the prior art) are provided in the power output section 21b. Specifically, the torque converter 4, the lock-up clutch 5 and the disengaging clutch 6 are placed in the power output section 21b, and hence, a larger ratio of moment of inertia of the power output section 21b to the power input section 20b is attained, compared with the prior art. Thus, the larger ratio of moment of inertia of the power output section 21b results in a resonance frequency being equal to or lower than an idle speed of the engine 50. Consequently, clattering sounds and indistinct sounds from the transmission are reduced. The third embodiment is believed to provide an improved effect better than the first and second embodiments.

In prior art power transmission system, a disengaging clutch which is a component of a power input section. However, in accordance with one aspect of the present invention, the disengaging clutch is positioned in the power output section of a power transmission system where the power input section and the power output section are separated by an elastic coupling mechanism. Hence, a larger ratio of moment of inertia is attained in the power output section, compared with the prior art, and the resonance frequency can be reduced down to below or equal to the idling speed of the engine. Consequently, clattering sounds and an indistinct sounds from the transmission are diminished.

In a power transmission system in another aspect of the present invention, a disengaging clutch and a lock-up clutch are disposed close to a power output section in a power transmission system where the power input section and the power output section are separated by an elastic coupling mechanism. Hence, a larger ratio of moment of inertia of the power output section to the power input section is attained, and the resonance frequency of the system can be reduced to idle speed of the engine or below. Consequently, clattering sounds and indistinct sounds from the transmission can be reduced.

In a power transmission system in still another aspect of the present invention, a torque converter, a lock-up clutch and a disengaging clutch are disposed close to a power output section of a power transmission system where the power input section and the power output section are separated by an elastic coupling mechanism. Hence a larger ratio of moment of inertia of the power output section to the power input section is attained. Hence, the resonance frequency of the system can be reduced to engine idle speed or below, and clattering sounds and indistinct sounds from the transmission are reduced.

When the elastic coupling mechanism, the lock-up clutch and the disengaging clutch are disposed close to an outer circumference of the torque converter, a dimension of the power transmission system in axial directions can be minimized.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A power transmission system comprising:

a power input section including a flywheel;

an elastic coupling mechanism connected to said power input section;

a power output section connected to a manual transmission input shaft, said power output section connected to said elastic coupling mechanism wherein said power output section includes a selectively operable disengaging clutch and at least a turbine of a torque converter, said turbine connected to said disengaging clutch;

a lock-up clutch disposed within said power output section connected to said elastic coupling mechanism and said turbine, and an impeller of said torque converter being part of said power input section; and wherein the ratio of the moment of inertia of said power input section to the moment of inertia of said power output section provides a resonance frequency of the power transmission system less than or equal to an idle speed of an engine providing torque to the power transmission system.

2. A power transmission system comprising:

a power input section including a flywheel;

an elastic coupling mechanism connected to said power input section;

a power output section connected to a manual transmission input shaft said power output section connected to said elastic coupling mechanism wherein said power output section includes a selectively operable disengaging clutch and at least a turbine of a torque converter, said turbine connected to said disengaging clutch;

a lock-up clutch disposed within said power output section connected to said elastic coupling mechanism and said turbine, and an impeller of said torque converter being part of said power output section; and wherein the ratio of the moment of inertia of said power input section to the moment of inertia of said power output section provides a resonance frequency of the power transmission system less than or equal to an idle speed of an engine providing torque to the power transmission system.

3. A power transmission system for transmitting torque from an engine to a manual transmission, comprising:

a lock-up clutch having a lock-up input and a lock-up output, said lock-up input being connected to a flywheel;

an elastic coupling mechanism connected to said lock-up output;

a torque converter having an impeller and a turbine, said impeller connected to said flywheel and said lock-up input, and a disengaging clutch having an input side and an output side, said input side connected to said elastic coupling mechanism and said turbine and said output side connected to a manual transmission input shaft;

wherein said elastic coupling mechanism, said lock-up clutch and said disengaging clutch are disposed proximate to an outer radial portion of said turbine of said torque converter.

4. A power transmission system for transmitting torque from an engine to a manual transmission, comprising:

an elastic coupling mechanism connected to a flywheel;

a torque converter having a turbine and an impeller, said impeller connected to said flywheel;

a lock-up clutch having a lock-up input and a lock-up output, said lock-up input connected to said elastic coupling mechanism and said lock-up output connected to said turbine; and a disengaging clutch having an input side and an output side, said input side connected to said turbine and said lock-up output and said output side connected to a manual transmission input shaft wherein said elastic coupling mechanism, said lock-up clutch and said disengaging clutch are disposed proximate to an outer radial portion of said turbine of said torque converter.

5. A power transmission system for transmitting torque from an engine to a manual transmission, comprising:

an elastic coupling mechanism connected to a flywheel;

a torque converter having an impeller and a turbine, said impeller coupled to said elastic coupling mechanism;

a lock-up clutch having a lock-up input and a lock-up output, said lock-up input connected to said elastic coupling mechanism and said impeller, and a disengaging clutch having an input side and an output side, said input side connected to said turbine and said lock-up output and said output side coupled to a manual transmission input shaft; and wherein said elastic coupling mechanism, said lock-up clutch and said disengaging clutch are disposed proximate to an outer radial portion of said turbine of said torque converter.

6. A torque converter comprising:

a power input member, a power output member, an impeller and a turbine, said power input member being connected to a flywheel supported on a shaft of an engine;

a lock-up clutch having an input and an output, said input and said impeller both connected to said power input member;

an elastic member connected to said output of said lock-up clutch, said turbine connected to said elastic member such that said elastic member allows for limited rotary displacement between said lock-up clutch and said turbine;

a disengaging clutch having a clutch input and a clutch output, said clutch input connected to said turbine and said clutch output connected to said power output member; and wherein where said disengaging clutch is in a disengaged state said turbine may rotate freely with respect to said power output member;

where said disengaging clutch is in an engaged state said turbine is mechanically coupled to said power output member for rotation therewith; and where a power input section is defined by the flywheel, the shaft of the engine and said lock-up clutch, said power input section having a moment of inertia;

a power output section is defined by said disengaging clutch and said power output member, said power output section having a moment of inertia;

said elastic member is disposed between said power input section and said power output section;

the ratio of the moment of inertia of said power input section, to the moment of inertia of said power output section provides a resonance frequency of the torque converter less than or equal to an idle speed of the engine providing torque to the torque converter; and wherein said lock-up clutch and said disengaging clutch are disposed proximate a radially outward portion of said turbine.

7. The torque converter as in claim 6 wherein said lock-up clutch and said disengaging clutch are disposed radially outward from said turbine.

8. A torque converter comprising:

a power input member, a power output member, an impeller and a turbine, said power input member being connected to a flywheel supported on a shaft of an engine;

an elastic member, said elastic member and said impeller both connected to said power input member;

a lock-up clutch having an input and an output, said input connected to said elastic member and said output connected to said turbine, said elastic member allowing for limited rotary displacement between said lock-up clutch and said power input member;

a disengaging clutch having a clutch input and a clutch output, said clutch input connected to said turbine and said clutch output connected to said power output member; and wherein where said disengaging clutch is in a disengaged state said turbine may rotate freely with respect to said power output member;

where said disengaging clutch is in an engaged state said turbine is mechanically coupled to said power output member for rotation therewith; and where a power input section is defined by the flywheel and the shaft of the engine, said power input section having a moment of inertia;

a power output section is defined by said disengaging clutch, said lock-up clutch and said power output member, said power output section having a moment of inertia;

said elastic member is disposed between said power input section and said power output section;

the ratio of the moment of inertia of the combination of said power input section, to the moment of inertia of said power output section provides a resonance frequency of the torque converter less than or equal to an idle speed of the engine providing torque to the torque converter.

9. The torque converter as in claim 8 wherein said lock-up clutch and said disengaging clutch are disposed proximate a radially outward portion of said turbine.

10. The torque converter as in claim 8 wherein said lock-up clutch and said disengaging clutch are disposed radially outward from said turbine.

11. A torque converter comprising:

a power input member, a power output member, an impeller and a turbine, said power input member being connected to a flywheel supported on a shaft of an engine;

an elastic member, said elastic member connected to said power input member and said impeller, said elastic member allowing for limited rotary displacement between said impeller and said power input member;

a lock-up clutch having an input and an output, said input connected to said elastic member and said impeller, and said output connected to said turbine, a disengaging clutch having a clutch input and a clutch output, said clutch input connected to said turbine and said clutch output connected to said power output member; and wherein where said disengaging clutch is in a disengaged state said turbine may rotate freely with respect to said power output member;

where said disengaging clutch is in an engaged state said turbine is mechanically coupled to said power output member for rotation therewith; and where a power input section is defined by the flywheel and the shaft of the engine, said power input section having a moment of inertia;

a power output section is defined by said disengaging clutch, said lock-up clutch and said power output member, said power output section having a moment of inertia;

said elastic member is disposed between said power input section and said power output section;

the ratio of the moment of inertia of said power input section, to the moment of inertia of said power output section provides a resonance frequency of the torque converter less than or equal to an idle speed of the engine providing torque to the torque converter.

12. The torque converter as in claim 11 wherein said lock-up clutch and said disengaging clutch are disposed proximate a radially outward portion of said turbine.

13. The torque converter as in claim 11 wherein said lock-up clutch and said disengaging clutch are disposed radially outward from said turbine.

* * * * *